US012502861B2

(12) United States Patent
Sartori

(10) Patent No.: US 12,502,861 B2
(45) Date of Patent: Dec. 23, 2025

(54) HYDRAULIC OR OLEODYNAMIC OR PNEUMATIC PRESS

(71) Applicant: Muraro S.r.l., Padua (IT)

(72) Inventor: Angelo Sartori, Padua (IT)

(73) Assignee: MURARO S.R.L., Padua (IT)

(*) Notice: Subject to any disclaimer, the term of this patent is extended or adjusted under 35 U.S.C. 154(b) by 286 days.

(21) Appl. No.: 18/281,214

(22) PCT Filed: Mar. 11, 2022

(86) PCT No.: PCT/IB2022/052210

§ 371 (c)(1),
(2) Date: Sep. 8, 2023

(87) PCT Pub. No.: WO2022/190057

PCT Pub. Date: Sep. 15, 2022

(65) Prior Publication Data

US 2024/0157664 A1 May 16, 2024

(30) Foreign Application Priority Data

Mar. 11, 2021 (IT) ........................ 102021000005816

(51) Int. Cl.
*B30B 15/18* (2006.01)
*B30B 1/32* (2006.01)
*B30B 15/00* (2006.01)

(52) U.S. Cl.
CPC ................ *B30B 15/18* (2013.01); *B30B 1/32* (2013.01); *B30B 15/0052* (2013.01)

(58) Field of Classification Search
CPC ....... B30B 1/32; B30B 15/04; B30B 15/0052; B30B 15/14; B30B 15/16; B30B 15/18; F16F 15/3156
See application file for complete search history.

(56) References Cited

U.S. PATENT DOCUMENTS

| | | | | |
|---|---|---|---|---|
| 2,273,315 | A | 2/1942 | Cotner | |
| 2,614,539 | A | 10/1952 | Walter | |
| 5,526,738 | A | 6/1996 | Logan | |
| 6,193,623 | B1 * | 2/2001 | Koch | F16H 7/0836 474/138 |

FOREIGN PATENT DOCUMENTS

| | | | | |
|---|---|---|---|---|
| CN | 107031092 | A * | 8/2017 | B30B 1/32 |
| DE | 3017406 | A1 | 11/1981 | |
| EP | 0116024 | A1 | 8/1984 | |
| JP | S60154900 | A | 8/1985 | |
| JP | H08118086 | A | 5/1996 | |
| JP | H08174097 | A | 7/1996 | |
| JP | H0988906 | A | 3/1997 | |

OTHER PUBLICATIONS

International Search Report for PCT/IB2022/052210 dated Jun. 15, 2022 (3 pages).

* cited by examiner

*Primary Examiner* — Jimmy T Nguyen
(74) *Attorney, Agent, or Firm* — Tutunjian & Bitetto, P.C.

(57) ABSTRACT

A hydraulic or oleodynamic or pneumatic press including a pressing component and a basic component or top component defining with the pressing component an area or pressing zone (PZ) in which to arrange pieces or objects (OB) to be machined.

22 Claims, 9 Drawing Sheets

HYDRAULIC OR OLEODYNAMIC OR PNEUMATIC PRESS

TECHNICAL FIELD OF INVENTION

This invention concerns a hydraulic or oleodynamic or pneumatic press equipped with a specific drive group for the operation or displacement of a pressing component of the press, if desired to forge objects or pieces or to mould sheets or other products.

STATE OF THE PRIOR ART

Oleodynamic presses are usually equipped with pumps, usually with variable flow, for the movement of respective pressing plates, which pumps are driven by their respective electric motors, usually very large, because the pumps are approximately 350 kW or higher.

Each motor is attached directly to a respective pump and when the press is to be operated, the pump is switched in working condition, possibly by varying a special control plate.

However, particularly in the press sector, the working sequence provides for waiting periods alternating with short pressing periods and only during the latter the press acts actively and progressively according to the required force.

This results in graphs of the power absorption of the pumps from the motors that have peaks at the pressing periods, but in the other periods, i.e. In the waiting periods, the pumps are in a resting condition, during which, even if the pumps or a respective shaft is rotated by the motor, it acts at actually zero flow rate, which clearly determines a high inefficiency of the system, because large motors must be used although for most of the working sequence and more specifically during waiting periods no power is required from the system.

Moreover, in the event that electricity is lacking, as long as the power supply is not restored, it is not possible, unless a UPS or uninterruptible power supply is used, to extract the pieces from the pressing area of the press.

In addition, given the high temperatures, this can often lead to the onset of fires.

SUMMARY OF THE INVENTION

One object of the present invention is therefore to provide a new hydraulic or oleodynamic or pneumatic press.

Another object of the present invention is to provide a press as mentioned above that makes it possible to employ small electric motors while ensuring any necessary power peaks.

Another object of the present invention is to provide a press as indicated above that ensures economical and effective operation.

Another object of the present invention is to provide a press equipped with systems such as to guarantee the extraction of objects or pieces from the press even in the absence or shortage of power supply.

In accordance with one aspect of the invention, a press is provided according to the present application.

The present application refers to preferred and advantageous embodiments of the invention.

BRIEF DESCRIPTION OF THE DRAWINGS

Other features and advantages of the invention will be more evident from the description of an embodiment of a press, illustrated as an indication in the attached drawings in which.

In the attached drawings equal parts or components are distinguished by the same reference numbers.

DETAILED DESCRIPTION

Figure 1:
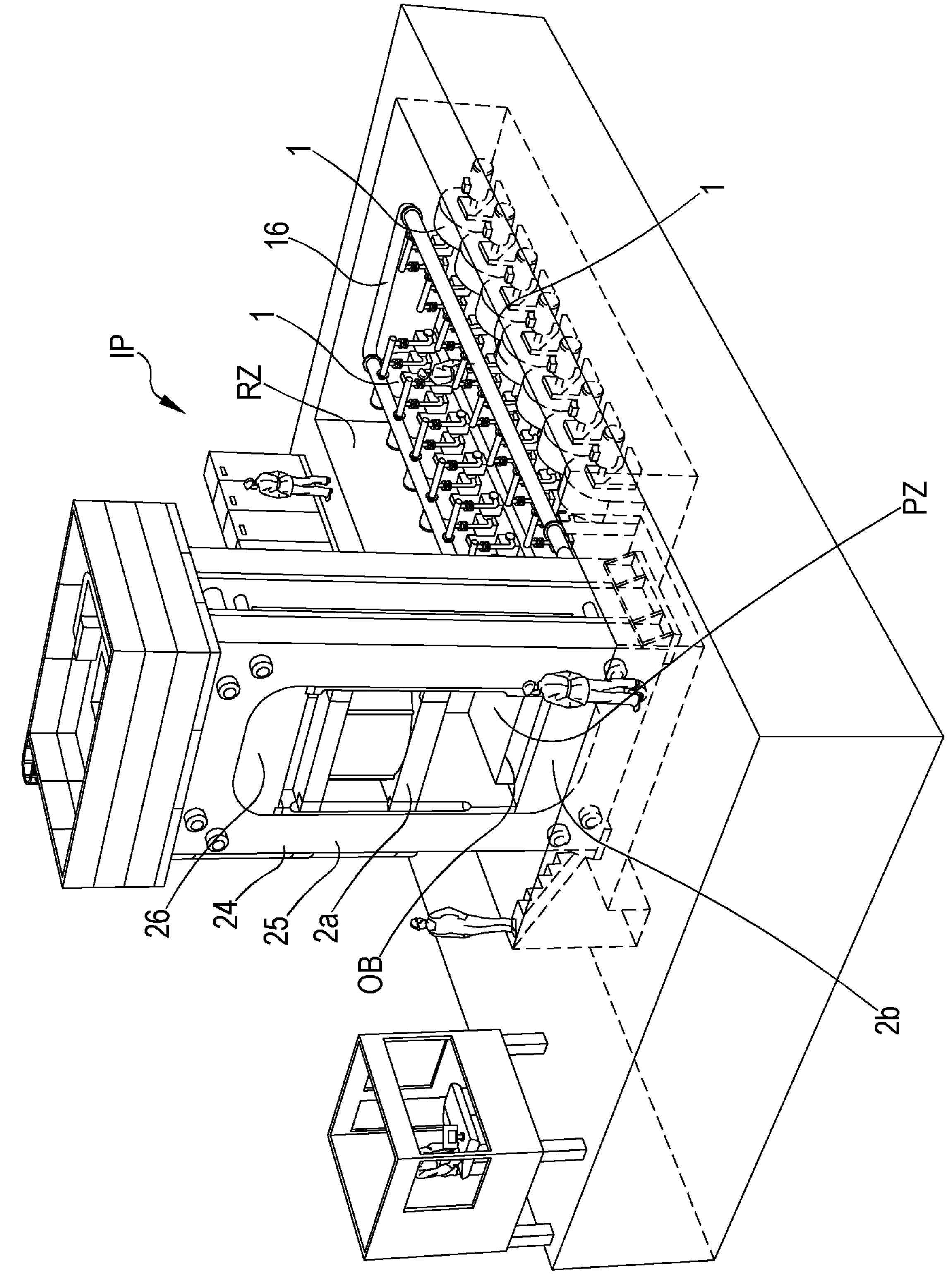
FIG. 1 is a perspective view slightly from the top of a press according to the present invention.
Figure 2:
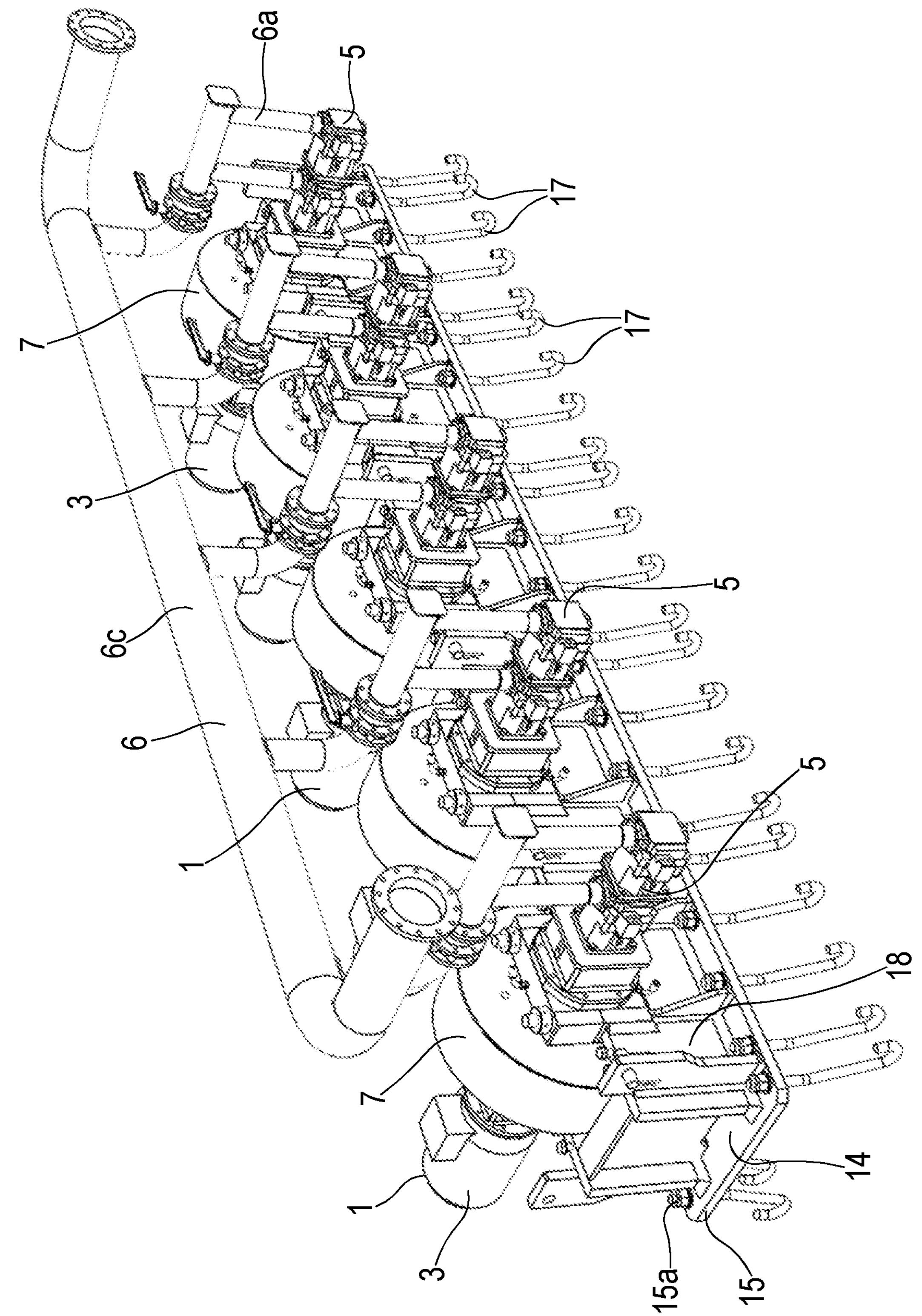
FIGS. 2 and 3 are perspective views from above and from respective sides of feeding units for a press according to this invention.
Figure 3:
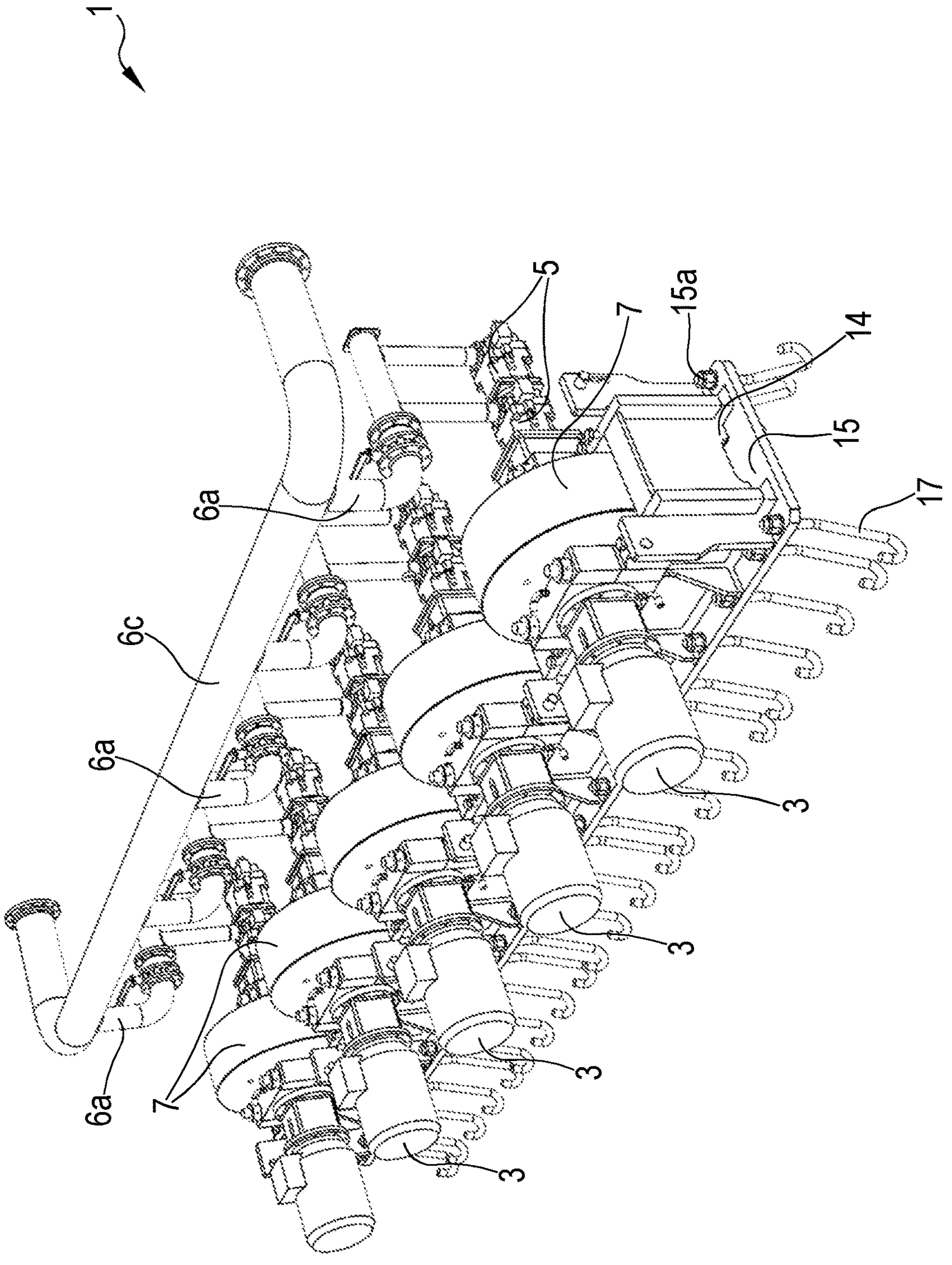
Figure 4:
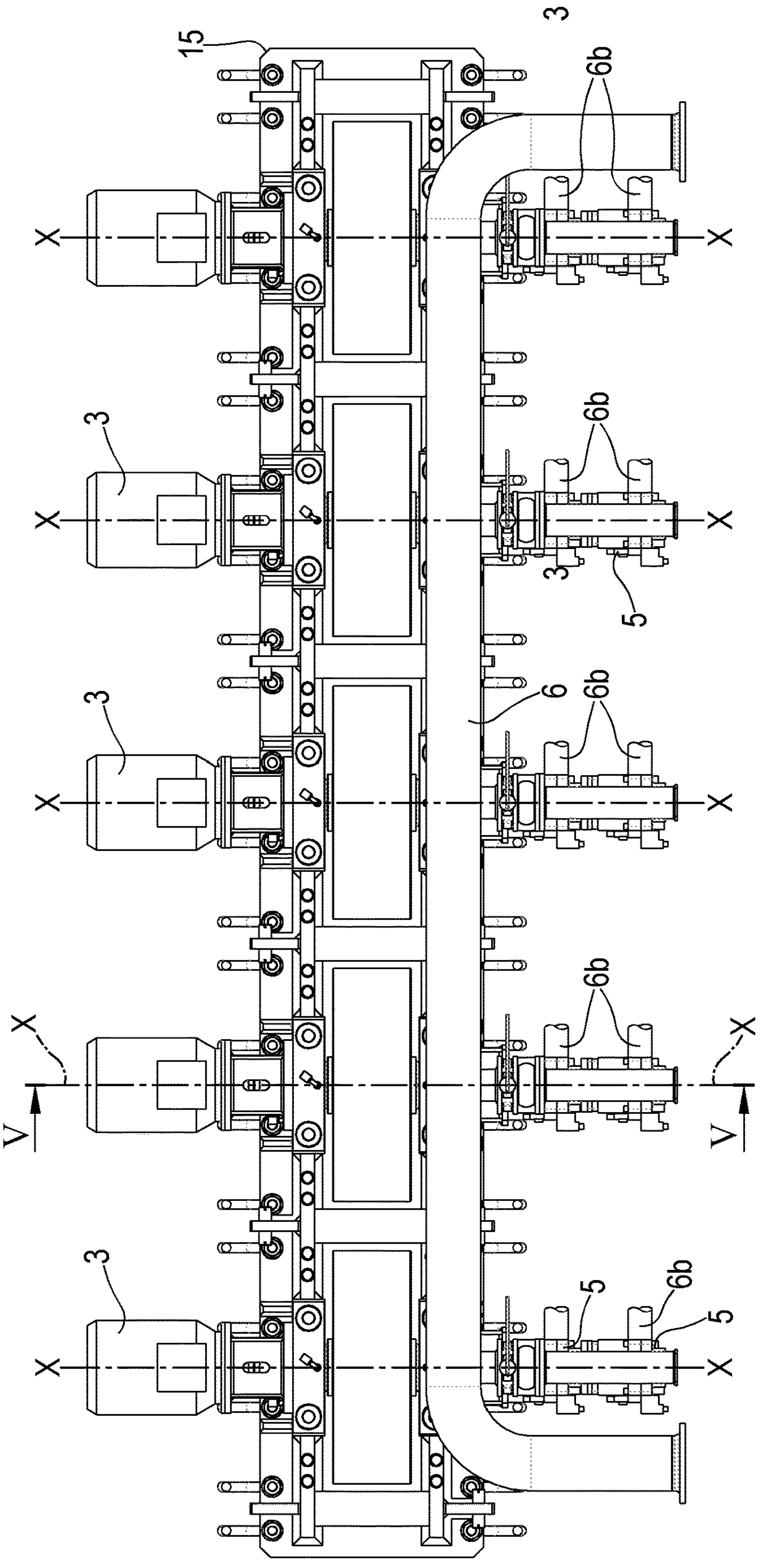
FIG. 4 is a top view of FIG. 2 groups.
Figure 5:
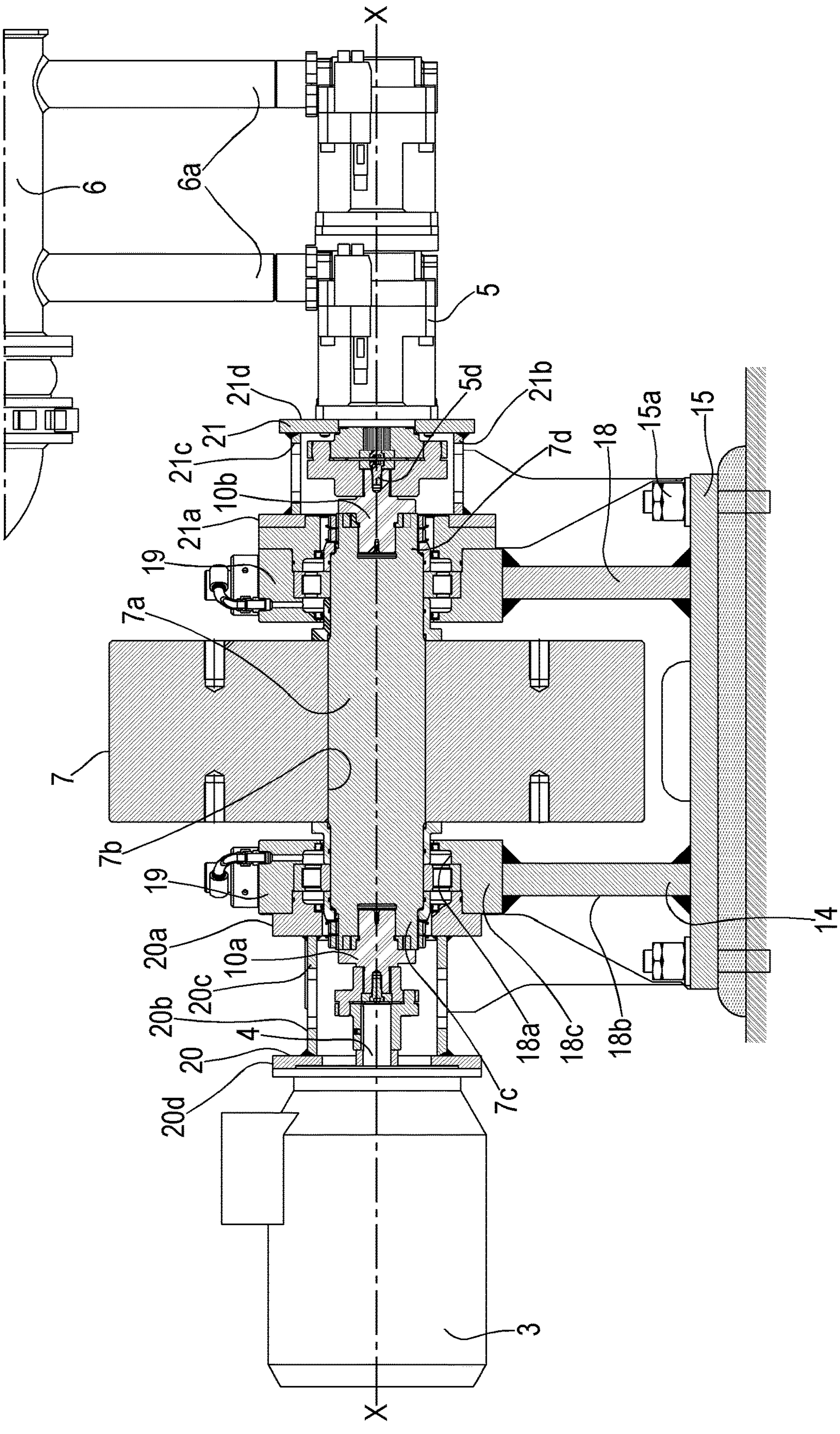
FIG. 5 is a view taken along the line V-V of FIG. 4.

With reference to the attached figures, a hydraulic or oleodynamic or pneumatic press IP equipped with one or more drive groups 1 of a pressing component 2*a* of the press is illustrated.

Press 1 is then also equipped with a base 2*b* or top component defining with the pressing component 2*a* a pressing area or area PZ where pieces or objects OB to be machined can be arranged.

Preferably, the hydraulic or oleodynamic or pneumatic press IP is for forging parts or for moulding sheets or other products.

As regards the or each drive group 1, it shall comprise at least one motor 3, preferably electric, which is arranged to rotate, preferably in a substantially continuous manner, a respective main shaft 4. In particular, the group 1 is for the operation of the pressing component 2*a* to move it in accordance with the respective work cycles.

As for the expression "in a substantially continuous manner", with the same it is meant that motor 3 is not continuously switched off and on, but the same is kept switched on during several cycles of operation of a pressing component 2*a*.

More specifically, motor 3 is switched on and kept on during several successive pressings, for example two, three, four or even more, and is not switched off after each pressing to switch it back on at the next pressing step.

Motor 3 can be for example a motor of not high power, for example between 10 and 100 kW, if desired between 25 and 45 kW or better between 36 and 38 kW. Clearly, motor 3 could also have power greater than 100 kW.

Group 1 then includes at least one pump 5 or compressor designed to suck and discharge a liquid, such as water or oil, or a gas for moving a pressing component 2*a*.

In this description reference will be made in some places to a pump and the liquid conveyed by it, but it will be understood that the same description applies to the case where a drive unit includes a compressor conveying a gas.

The group 1 further includes a circuit 6 for conveying the liquid or gas in suction, crossing and delivery from the pump 5 or compressor, which circuit 6 is arranged to suitably convey the liquid or gas for pushing or in any case moving the pressing component 2*a*.

As regards in detail the embodiment with a pump 5, it may be a variable flow pump with cylinder and piston units 5*a*, 5*b* and a drive plate 5*c* responsible for engaging and handling a component of each cylinder and piston unit 5*a*, 5*b* when plate 5*c* or unit 5*a*, 5*b* is placed in rotation.

More specifically, pump 5 can be a variable flow pump with axial units cylinder and piston 5*a*, 5*b*, i.e. it includes a second shaft 5*d* rotatable around a second axis y-y and is integral in rotation with the cylinder and piston units 5*a*, 5*b* or with the plate 5*c*, with cylinder and piston units 5*a*, 5*b* mounted around a portion of that shaft 5*d* with pistons 5*b* sliding along axes parallel to the second axis y-y of the second shaft 5*d*.

A shoe component 5*e* can also slide on the plate 5*c* joined, if desired by means of spherical joints to the cylinders 5*a* or to the pistons 5*b*.

The plate 5*c* is a plate, for example, annular in which the second shaft 5*d* is inserted and which is hinged with a respective hinge pin (not shown in figures) to a moving or fixed part of the pump or a carter of the same, which part may or may not be integral in rotation with the second shaft 5*d*. More specifically, the plate 5*c* is pivoted around a third axis orthogonal to the second axis y-y so as to be angularly movable between at least a second position in which it has a main extension plane orthogonal to the second axis and a plurality of first inclined positions, in which the plate 5*c* has the main extension plane that defines an angle Q greater or less than 0 and greater or lesser than the second position (which could also be at Q=0).

Thanks to this expedient, by moving the plate 5*c* around the respective hinge pin it is possible to vary the stroke of the pistons 5*b* and thus the flow rate of the pump when the rotation of the second 5*d* shaft is controlled, which determines a rotation of the plate 5*c* and not of the cylinder or piston units 5*a*, 5*b* or of the cylinder units 5*a* and piston 5*b* and not of the plate 5*c* (which in this case would be hinged on a fixed part of the pump).

Clearly, when the plate 5*c* is in the second position (for example Q=0) the pump is actually with very low or zero flow rate, since by rotating the second shaft 5*d*, the pistons 5*b* remain substantially in the same axial position or do not flow along the respective axis parallel to the second axis, while with the plate 5*c* in a first position (Q 0), by controlling the rotation of the second shaft 5*d*, the pistons 5*b* make a greater stroke the greater the angle Q and consequently the flow rate is different from 0 to a greater or lesser extent depending on the entity (greater or lesser) of that angle.

As will be understood, such a variable flow pump would also include a distribution plate 9 of the liquid or gas, which plate 9 can include, for example, through channels 9*a* in fluid communication on the one hand with the output of the cylinder and piston units 5*a*, 5*b* and on the other with at least one pump delivery that constitutes a supply section of the conveying circuit 6 to the pressing component 2*a* to be moved. The distribution plate 9 is preferably fixed or not integral in rotation with the second shaft 5*d*, if the latter is integral in rotation with the cylinder and piston units 5*a*, 5*b*, while it is mounted rotatable around the second axis or integral in rotation with the second shaft 5*d*, if the latter is not integral in rotation with the cylinder and piston units 5*a*, 5*b*.

Of course, a variable flow pump 5 for a group 1 could also be structured differently and the above provided description is only by way of example.

According to a less preferred variant, the pump 5 is with fixed flow rate.

In addition, the group 1 shall be equipped with at least one switching component 8*a* for switching between at least a first operating condition and at least one second operating condition of the pump 5 or compressor and/or a discharge or by-pass (not shown in figures) of conveying circuit 6, preferably but not necessarily downstream of pump 5 or compressor. The by-pass is a branch section of the conveying circuit that does not lead or flow into the pressing component 2*a* or a pressure multiplier upstream of the pressing component 2*a*, so that the liquid or gas fed in the by-pass does not contribute to the displacement of the latter.

If desired, but not necessarily, at least one control component 8*b* of the switching component 8*a* is also provided to switch it between the at least one first operating condition and at least one second operating condition.

If the pump 5 or compressor is with variable flow rate, in the first operating condition, the pump 5 or compressor could operate at a first delivery flow rate of the liquid or gas, while in the second operating condition the pump or compressor could operate at a second delivery flow rate lower than the first flow rate or at a second flow rate equal to zero.

In that case, the first flow rate would be able to properly move or displace a pressing component 2*a*, while the second flow rate would not be able to perform that task or would in any, case perform it differently from the first.

According to this variant, if the pump 5 is made as indicated above, the switching component 8*a* could be responsible for angularly moving the plate 5*c* to move the pump from the at least one first (Q$^{1}$ 0) to the at least one second (for example Q=0) operating condition or vice versa.

Of course, the switching component 8*a* can be such as to place the 5*c* plate in any of the positions with Q$^{1}$ 0 or only in some specific positions.

According to this variant, the switching component 8*a* can be or include an actuator or similar, if desired electrical, oleodynamic, hydraulic arranged to angularly move by a desired entity the plate 5*c* around its hinge pin.

A control component 8*b* can thus be provided, if desired electronic, mechanical or electro-mechanical arranged to control the switching component 8*a*.

Of course, according to a less preferred variant, instead of an electronic control component could also be provided a different control component, if desired manual that makes it possible to act on a mechanical element.

Preferably, the control component 8*b* can be a constant power regulator, which is such as to ensure that the power delivered by pump 5 is always the same.

In this regard, the power delivered by a pump is given by the pressure of the fluid delivered for the flow rate.

In a press as according to the present invention, the pressure of the liquid fed by pump 5 is in fact determined by the pressing step, as during a non-processing or pressing phase, the pressure is almost zero, while during pressing the pressure is greater than zero.

A constant power regulator 8*b* would ensure that as the pressure required for the liquid conveyed by the pump for the execution of the various pressing steps increased, the pump flow rate was reduced by reducing the angle Q and vice versa.

Thanks to this expedient, it would be ensured that regardless of the power potentially available to the pump, the flow rate of the latter is varied according to the real needs during the work cycles of the press.

Depending on this, when the pressure demand is lower, there would be a greater flow rate and vice versa.

Of course, another type of regulator could also be envisaged, for example at constant pressure, at constant flow rate or otherwise.

In the case of a regulator with constant power, pressure or flow rate, there would therefore be not only a switching between the first and second operating conditions, but also a specific and appropriately variable control of the operation of the pump or compressor in the first operating condition.

Moreover, the group or press can also be equipped with special sensors (not shown in figures) arranged to detect the angular displacement of the plate 5*c*.

In addition to or as an alternative to what is now indicated, an exhaust or by-pass of the conveying circuit 6 may be provided, so that in the first operating condition, the exhaust or by-pass is closed or less open than in the second operating condition, so that pump 5 or compressor can deliver or convey the liquid or gas to the pressing component 2*a* to be operated, moving it, while in the second operating condition, the exhaust or by-pass is open or partially open so it is not possible to deliver the liquid or gas from pump 5 or compressor to the pressing component 2*a* to be operated or in any case it is not possible to do so with a flow rate satisfactory to move the pressing component 2*a*.

In this regard, when the exhaust or by-pass of the conveying circuit is closed or partially closed, the flow rate of gas or liquid conveyed through the conveying circuit 6 to the pressing component 2*a* is able to displace or move this component 2*a* appropriately, while when in the second condition the exhaust or by-pass is opened or in any case this element is opened to an extent greater than the first condition, the flow rate of gas or liquid conveyed through the conveying circuit 6 to the pressing component 2*a* is zero or in any case would not be able to perform this task depending on the sizing of the various components.

According to such a variant, the pump or compressor may also be with fixed flow rate.

In addition to or as an alternative to the above, the switching component may include a motion interception component from motor 3 to pump 5, such as a clutch or similar component suitably operated by means of a control component, if desired including an actuator and/or an electronic component or a manual control component.

It will be understood that the group 1 or in any case the press preferably even includes a valve or a group of valves responsible for controlling and properly adjusting the supply of liquid or gas between the pump or pumps 5 and the pressing component 2*a*.

In this respect, the liquid or gas conveying circuit 6 may, for example, include at least one suction duct 6*a* extending between the pump 5 or compressor and at least one cylinder of an actuator or system 11*a*, 11*b*, 11*c* with one or more hydraulic or oleodynamic or pneumatic cylinders 11*a*1, 11*b*1, 11*c*1 and pistons 11*a*2, 11*b*2, 11*c*2 of the press.

Alternatively or in addition to what has been now indicated, the suction duct 6*a* can extend between pump 5 and a special tank or container.

The liquid or gas conveying circuit 6 then comprises at least one delivery duct 6*b* extending between the pump 5 or compressor and a cylinder of an actuator or system 11*a*, 11*b* with one or more hydraulic or oleodynamic or hydraulic or pneumatic cylinders and pistons of the press.

In essence, therefore, depending on whether the actuator or system with hydraulic or oleodynamic or hydraulic or pneumatic cylinders and pistons of the press is simple (see FIGS. 8, 10 and 12) or double (see FIGS. 9, 11 and 13) acting, the pump or compressor is arrange to draw the liquid or gas from at least one first cylinder of an actuator and send it into at least one second cylinder of another actuator and/or into an auxiliary tank, in accordance with a simple-acting scheme, or draw the liquid or gas from at least one part of a cylinder of an actuator during a duty cycle and send it to at least one other part of the cylinder of the actuator and/or auxiliary tank during a second duty cycle, in accordance with a double-acting operating scheme.

Clearly, the pump could suck in or send part of the liquid or gas from/into an auxiliary tank 12, particularly in a thrust condition as the thrust surfaces of the liquid or gas are usually different during the various working steps.

Of course, different operating schemes could also be envisaged in accordance with the provisions of the field.

Figure 11:
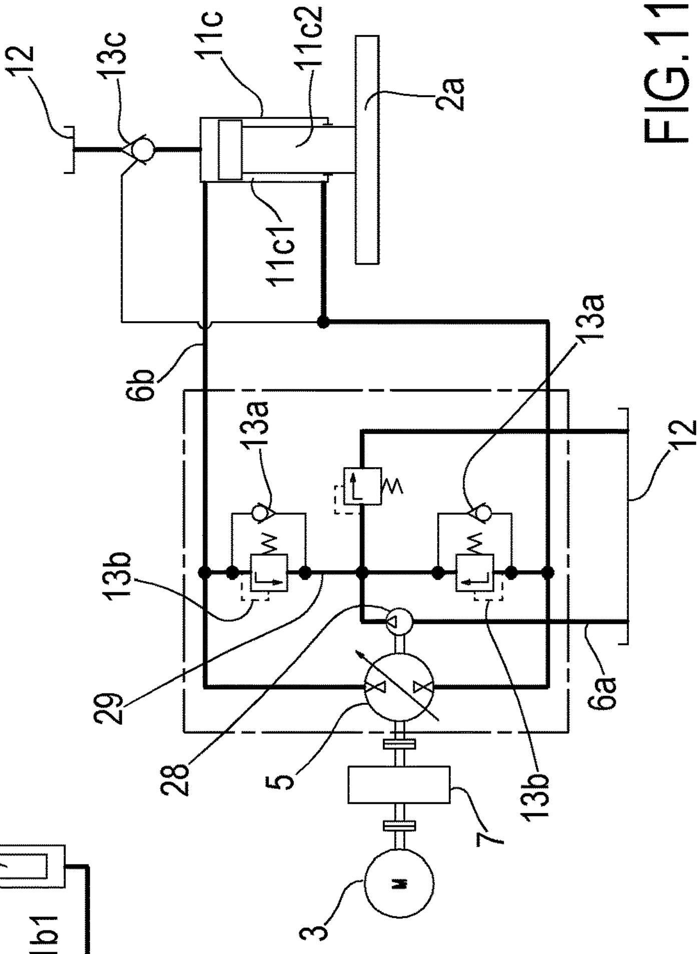
FIGS. 10 and 11 are views to be similar, respectively, to FIGS. 8 and 9 of another embodiment in accordance with the present invention.
Figure 13:
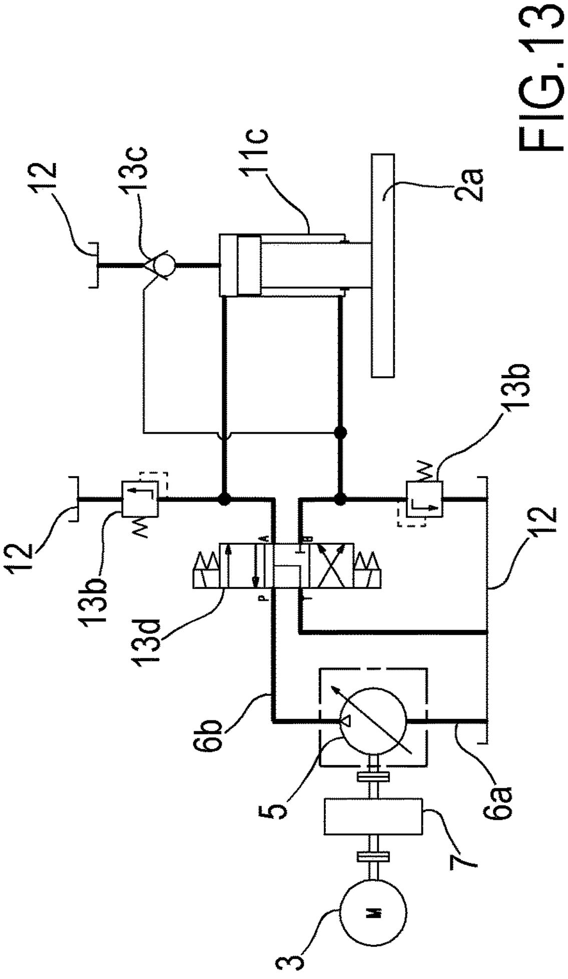
FIGS. 12 and 13 are views to be similar, respectively, to FIGS. 8 and 9 of another embodiment in accordance with the present invention.
Figure 12:
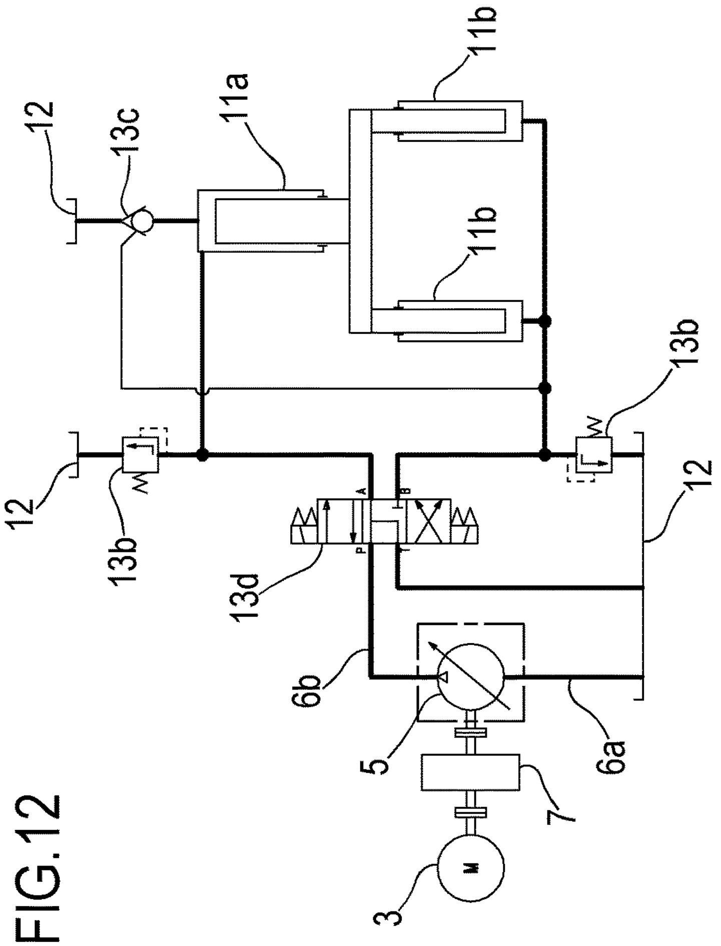

It should also be noted that pump 5 could be a reversible or reverse delivery pump (see FIGS. 8-11) or a pump with a single delivery direction (see FIGS. 12 and 13).

Figure 7:
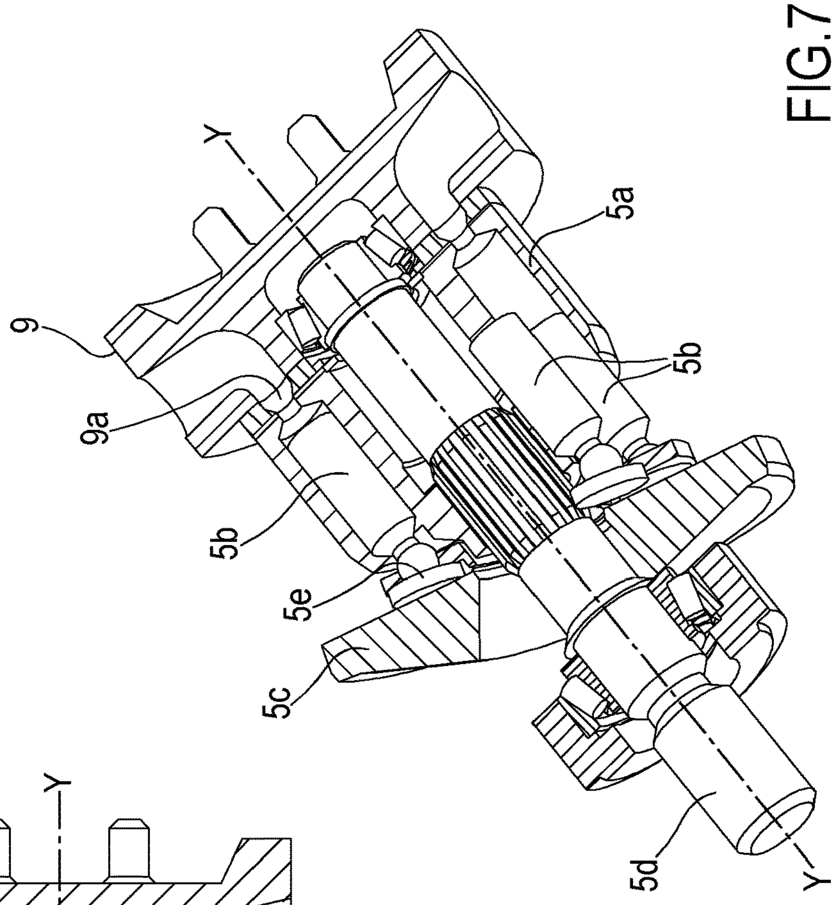
FIG. 7 is a perspective view with sectional parts of the pump in FIG. 6.
Figure 6:
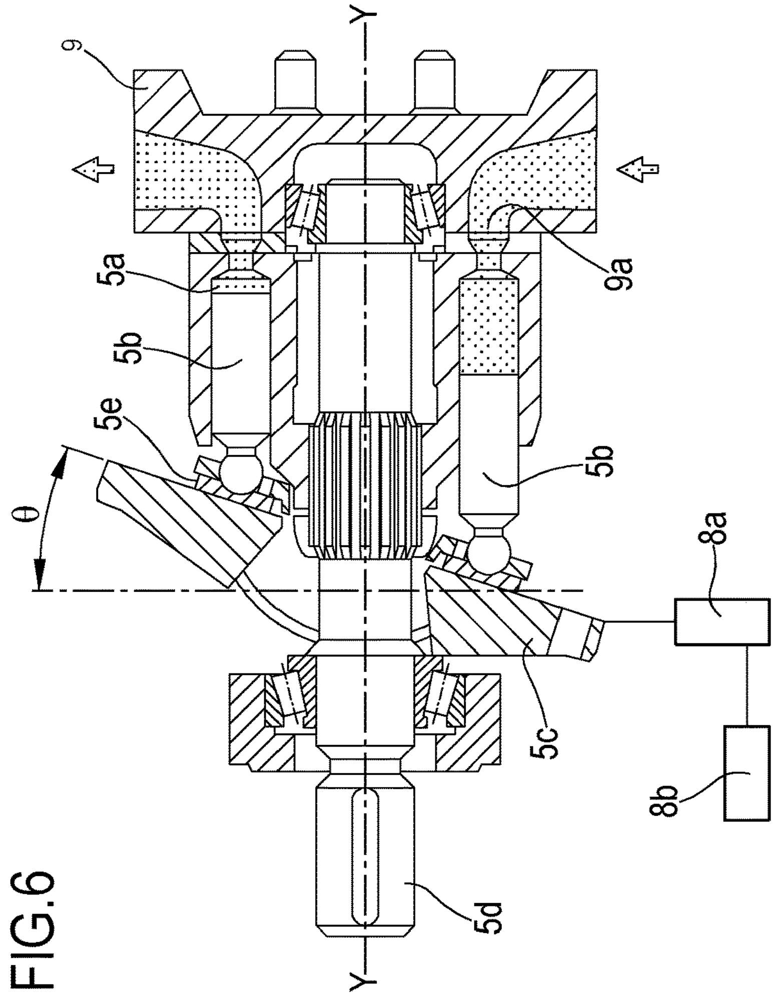
FIG. 6 is a sectional view of a variable flow pump for a press according to this invention with schematic indication of a respective switching and control component.

As for the case with reversible or reverse delivery pump, as will be understood, moving the plate 5*c* so as to vary the angle Q from positive to negative or in any case starting from Q=0 in one direction or in the opposite direction, this is to say with reference to FIGS. 6 and 7 before with upper, in figures, portion closer to the distribution plate 9 than the lower, in figures, portion and therefore with the lower portion closer to the distribution plate 9 than the upper portion, the operation of pump 5 is reversed, so that the suction mouth of the pump becomes delivery and vice versa or in any case the pump delivery is changed or reversed, while the suction can also remain the same.

Clearly, the reverse delivery would allow first to approach pressing component 2*a* and base component 2*b* and then, after reversing the operation of the pump, to move them away.

Of course, the power applied during the closing of the press and therefore during the approach of the pressing component 2*a* to the base component 2*b* could be the same as the opening step of the press and thus during the removal of the pressing component 2*a* from the base component 2*b*. Alternatively, one could have power applied during the opening step of the press less than the closing phase of the same.

Therefore, with a pump made as shown in FIGS. 6 and 7, the angle Q during the closing of the press could have the opposite direction but the same entity at the angle Q during the opening of the press, or it could even be greater than the latter.

In this regard, the presence of the valve group ensures that once the angle Q is reversed, it is possible to operate correctly in suction and delivery.

Such a group of valves preferably includes in this case check or unidirectional valves, which in fact open and close automatically depending on the direction of conveyance of the liquid or gas in the circuit.

Clearly, when one or more reverse delivery pumps are used, the suction duct during an operating cycle can become a delivery duct in a subsequent operating cycle in which the operation of the pump has been reversed and vice versa. In this case, it is therefore not possible to uniquely identify a suction and delivery duct.

Alternatively, always when one or more delivery inversion pumps are used, the suction duct is always the same during each operating cycle, while the pump directs the fluid alternately first in a first delivery circuit and then in a second delivery circuit.

In this case, the reverse delivery pump would have at least three outlets, one suction and two delivery mouths.

It will also be understood that reverse delivery pump is used, there would be at least a first operating condition with pump delivery from a first side and suction from a second side and with pump delivery from the second or from a third side and suction from the first or second side, while at least one second operating condition may be unique.

In this case, then the angle Q would be greater or less than 0 (therefore with a first delivery and with delivery inverted compared to the first) in the first operating condition, while in the second operating condition it would be 0 or in any case with a value small or lower than the first operating condition.

In addition, the group 1 includes at least one flywheel 7 interposed, at least functionally but also preferably structurally, between motor 3 and pump 5 or compressor, which flywheel 7 is kinematically connected on one side, to the main shaft 4, so that flywheel 7 is dragged in rotation by the latter, in particular in a substantially continuous manner or in any case is dragged by the engine 3 as long as engine 3 is driven. Of course, a decoupling component, such as a clutch, could also be envisaged between engine 3 and flywheel 7 to be operated when necessary or desired.

On the other hand, the flywheel 7 or a respective shaft 7*a* is kinematically connected to pump 5 or compressor or rather to a respective second shaft 5*d* or rotation component of the pump 5 or compressor to transfer thereto or the rotary motion imparted by the motor 3, in such a way that

- the pump or compressor moves or pushes the liquid or gas in the conveying circuit 6 and up to a respective portion of engagement of a pressing component 2*a* so as to move or displace it, as a result of the motion imparted thereto by the flywheel 7 only in the first operating condition or to a greater extent or with greater power in the first operating condition,
- while in the second operating condition, the pump 5 or the compressor does not move or push or rather is not able to move or push the liquid or gas in the conveying circuit 6 up to or so as to operate a pressing component 2*a*, or moves or pushes it to a lesser extent or with a lower flow rate or with less power with regard to the first operating condition so that it is not able to move or displace the pressing component 2*a*.

To better clarify the above reasoning, in the first operating condition the pump 5 or compressor is kinematically connected to the flywheel 7 and receives motion from it and also the conveyance circuit 6 of the liquid or gas between pump or compressor and pressing component 2*a* is not obstructed, closed or a respective by-pass section or discharge is not opened, so that the rotation of the flywheel 7 determines a corresponding rotation of a second shaft 5*d* or rotation component of the pump 5 and a defined flow rate of liquid or gas in the conveying circuit until it reaches or so as to operate the pressing component 2*a* and move it or displace it appropriately.

In the second operating condition, on the other hand, the pump 5 or compressor is kinematically disconnected from the flywheel 7 and does not receive motion from it and/or the conveyance circuit 6 of the liquid or gas between pump or compressor and pressing component 2*a* is obstructed, closed or a respective by pass section is opened that does not flow into or towards the pressing component 2*a*, so that the rotation of the flywheel 7 does not result in a corresponding rotation of a second shaft 5*d* or rotation component of the pump 5 and/or a defined flow rate of liquid or gas in the conveying circuit 6 until it reaches or so as to operate the pressing component 2*a* and move it. Therefore, in the second operating condition, the rotation of the flywheel 7 by the motor 3 does not result in a displacement of the pressing component 2*a* for one or more of the above causes.

Thus, in the second operating condition, the force or energy or power applied by the engine 3 to the flywheel 7 is not dispersed or better used to turn the second shaft 5*d* or a rotation component of the pump or compressor to push the respective liquid or gas up to or so as to operate the pressing component 2*a* or in any case it is dispersed or used much less than in e first operating condition.

Thanks to this, in the second operating condition, in the absence of the resistance or dispersion determined by the movement of the pressing component 2*a*, the motor 3 is able to appropriately increase the revolutions of the flywheel 7 and to actually "load" the same, that is to say to provide this component with energy or power to be returned at least in part during the first operating condition.

In this regard, the flywheel 7 and the other components are sized so that it discharges or reduces its rotational speed by a defined percentage, for example less than 40%, 30% or 20% during a part of the processing cycle corresponding to the first operating condition.

In essence, when the movement of the pressing component 2*a* has been carried out as desired, if desired, when the pressing step of a workpiece is terminated, the energy used by the flywheel 7 to drive the pump or compressor and properly push the liquid or gas in the circuit 6 up to or so as to operate the pressing component 2*a* determines a reduction in the revolutions of the flywheel, for example from about 1500 rpm to about 1300 rpm.

As will be understood, therefore, the flywheel 7 instead receives and in fact accumulates in successive steps, the power or energy of rotation from the motor 3 during the second operating condition and preferably both during the first and during the second operating condition, as long as, of course, the engine 3 is switched on.

To better explain this concept, the flywheel 7 is fixed or keyed on the main shaft 4 or on an auxiliary shaft 7*a* rigidly coupled to it or integral therewith or the flywheel 7 is in a single piece with the main shaft 4 or with any auxiliary shaft 7*a*, so by operating the engine 3 the latter drags into rotation the flywheel 7, preferably, but not necessarily with the same rotational revolutions, this is to say that auxiliary shaft 7*a* and shaft 4 of the motor 3 rotate preferably with the same number of revolutions.

Therefore, if the auxiliary shaft 7*a* is not provided, then a single main shaft 4 would be envisaged, which in this case could also act, in fact, as the rotor of the engine 3.

Moreover, the main shaft 4 or, if provided the auxiliary shaft 7*a*, could, in accordance with a variant be in a single piece with the flywheel 7.

If a constant power regulator is provided, this guarantees that, regardless of the power that the flywheel 7 can deliver, the pump 5 always works with the same power.

In such expedient is not employed, the flywheel 7 would tend to deliver or discharge the energy accumulated in it even in a short time and could also deliver Megawatts when the operation is switched from the second to the first condition, which condition clearly could determine the breakage of the pump.

The constant power regulator, which can be electronic and/or mechanical, instead ensures that, clearly in combination with the control unit, the ratio between flow rate× pressure of the liquid or gas delivered by the pump 5 or compressor is substantially constant.

Thus, for example, the constant power regulator could be set so that the pump delivers a maximum value between 200 and 400 kW or between 250 and 350 kW.

Therefore, regardless of the power that the flywheel 7 could transmit to pump 5, the latter absorbs from the flywheel to the maximum the value imposed by the constant power regulator.

In essence, if a constant power regulator is used, there would be a switching between the first and second operating conditions depending on whether or not the press is in the pressing step and therefore during the pressing (first operating condition) a specific and appropriately variable control of the operation of the pump or compressor in the first operating condition.

The same would clearly apply in the case of constant pressure or flow rate regulator, although in accordance with the respective operating schemes.

Of course, in a less preferred version the control component 8*b* only regulates or determines the transition between the first and second operating conditions and does not act instead as a regulator of power, pressure, flow rate or other.

Clearly, separate components could also be provided fir the performance of such functions, then one for switching between first (pressing) and second (rest) operating condition and the other to set the constant power, pressure or flow rate during pressing or first operating condition.

Of course, the main shaft 4 and the auxiliary shaft 7*a* preferentially both rotate around the same axis of rotation.

The auxiliary shaft 7*a*, if provided, may have a diameter larger, for example between 3/2 and 5 times, than the main shaft 4.

The flywheel 7 or the respective auxiliary shaft 7*a* can then be integral in rotation, opposite to the motor 3, by means of a special second shaft or pin 5*d* or rotation component with the pump 5 or compressor, so that the rotation of the flywheel 7, placed and maintained (at least during the first operating condition) in rotation by the motor 3, determines a rotation of a respective second shaft of the pump 5 or compressor.

In this regard, the auxiliary shaft 7*a* is rigidly coupled or integral with the second shaft 5*d* or rotation component of the pump 5 or compressor, so by driving the motor 3 the latter drags into rotation the flywheel 7 and the latter, in turn, puts the second shaft 5*d* in rotation, preferably with the same rotation revolutions, this means that auxiliary shaft 7*a* and second shaft 5*d* rotate preferably with the same number of revolutions.

The auxiliary shaft 7*a* and the second shaft 5*d* preferably both rotate around the same axis of rotation.

The auxiliary shaft 7*a* may have a diameter larger for example between 3/2 and 5 times, than the second shaft 5*d*.

Of course, if an interception component, such as a clutch, is provided as a switching component, it would be possible to decouple flywheel 7 and pump 5 or compressor, so that a rotation of the flywheel 7 would not result, in the period of intervention of the interception component, in a rotation of the pump or compressor or rather of a respective second shaft.

Clearly, if an interception component provided, the first operating condition would be with the interception component deactivated or in any case not such as to decouple auxiliary shaft 7*a* and second shaft 5*d* or rotation component of the pump or compressor, while the second operating condition would be with activated interception component or in any case such as to decouple auxiliary shaft 7*a* and second shaft 5*d*.

Preferably, the flywheel 7 is a disc-shaped or ring component defining a through axial opening 7*b* for the passage of the respective rotation shaft 7*a* corresponding or integral in rotation with the main shaft 4 of the motor 3 and drive of the pump or compressor.

In this case, the auxiliary shaft 7*a* preferentially protrudes from both sides of the flywheel 7, so that each end 7*c*, 7*d* of auxiliary shaft 7*a* protrudes from a respective side of the flywheel 7. The same applies in the case of auxiliary shafts in a single piece with the flywheel 7.

The flywheel 7 preferably has a diameter greater than 600 mm or 800 mm and less than S m, if desired a diameter between about 600 mm and 3 m, for example a diameter between about 900 mm and 1.5 in, if desired between about 1 and 1.2 m or between 1.8 and 2.2 m. Even more preferably, at least one flywheel 7 has a thickness between about 200 and 1000 mm, for example between about 300 and 500 mm, if desired with a thickness of about 380-400 or 390 mm.

If the flywheel 7 has not a circular base, it could still have a cross section or in any case an extension in a plane orthogonal to that of rotation equal to about 0.5-4 $m^2$, if desired about 0.8-1.2 $m^2$ or 0.9-1 $m^2$.

Advantageously, the flywheel 7 is made of metal, such as steel, but the same could also be made of other materials, for example, even a composite material.

As already partly indicated, the main shaft 4, the flywheel 7 (or rather a respective auxiliary shaft 7*a*) and a pin or second shaft 5*d* or a rotation component of the pump 5 are mounted for rotation around the same main extension axis x-x. In that case, the second y-y axis can be aligned to the x-x axis.

Clearly, any suitable components such as bearings, e.g. axial and/or radial thrust bearings, oil seals, labyrinths and/or other suitable components, may be used for the connection and transfer of motion between these components.

Going into more detail in the non-limiting specific structure of the drive group 1 shown in figures, it will be noted that among main shaft 4 of the motor 3 and auxiliary shaft 7*a* of the flywheel 7 can be provided a first connecting splined pin 10*a* and/or between auxiliary shaft 7*a* of the flywheel 7 and second shaft 5*d* of the pump 5 can be provided a second connecting splined pin 10*b*.

In this regard, a first splined pin 10*a* for connecting and kinematic linking main shaft 4 and auxiliary shaft 7*a* and/or a second splined pin 10*b* for connecting and kinematic linking auxiliary shaft 7*a* and second shaft 5*d* of the pump 5 can be provided.

More specifically, the first splined pin 10*a* could be fitted or fixed on one side in one end or tip of the main shaft 4 distal from the engine and on the other in one end 7*c* of the auxiliary shaft 7*a*.

The second splined pin 10*b* instead could be fitted or fixed on one side in one end or tip of the second shaft 5*d* distal from the pump body and on the other in an end 7*d* of the auxiliary shaft 7*a*.

Using splined pins 10*a*, 10*b* can be provided because in the event ha one should damage the engagement between engine 3 and flywheel 7 or between flywheel 7 and pump 5, it would be satisfactory to change this pin 10*a*, 10*b* only, possibly replacing it with a constraint by screws. Should instead such a splined pin 10*a*/10*b* not be provided, if one should damage the fitting or engagement between engine 3 and flywheel 7 or between flywheel 7 and pump 5, one should change all the respective component.

Clearly, according a less preferred variant, one or both splined pins 10*a*, 10*b* are not provided, but other means of kinematic connection could be envisaged or the various shafts, for example shafts 4 and 7*a*, could be made in single piece.

The drive unit 1 is clearly equipped with a main support unit 14, which can have any suitable configuration.

With reference to the non-limiting embodiment shown in figures, the support unit 14 includes a base 15, fixed to the ground for example by means of bolts 15*a* or similar means, vertical walls 18, which support the different components of group 1, protruding from the base 15.

More specifically, one or more of those walls 18 define a through opening or an upper cradle zone 18*a* in which or on which a shaft is mounted and supported, for example the main shaft 4 or the auxiliary shaft 7*a* with interposition of special hearings, if desired rolling bearings 16.

As one will understand, the flywheel 7 during operation accumulates a lot of energy, so it is preferable that it is mounted on a designated structure.

In this regard, such a wall 18 could have a lower section 18*b* and an upper section 18*c* thicker than the lower section and having a free end defining the cradle zone 18*a*, the two sections 18*b*, 18*c* being appropriately connected to each other, for example welded.

In the event that an upper cradle zone 18*a* is provided, then group 1 may also include one or more upper closing components 19, if desired C-shaped, each couplable, fir example by means of screws or bolts, with a respective vertical wall 18 to close from above the cradle zone 18*a* and the main shaft 4 or auxiliary shaft 7*a* provided therein, with interposition of special bearings.

Such a structure with wall 18 defining a cradle zone 18*a* and possible closing component 19 or in any case with a supporting part can be provided both on the side of the motor 3 and on the side of the pump 5, so that both ends 7*c*, 7*d* of the auxiliary shaft 7*a* or two ends or parts (if desired an end and an intermediate part) of the main shaft 4, each protruding from a respective side of the flywheel 7, would be supported by the main support unit 14, for example at respective cradle zones 18*a*.

Advantageously, the group 1 includes at least one bell or frame component 20, 21 for support, if desired cantileveringly supporting, of motor 3 and/or pump 5, which bell or frame component 20, 21 is supported, if desired cantileveringly supported by a respective wall 18.

More specifically, this bell or frame component 20, 21 can be cantileveringly supported by a wall 18 or by a respective upper section 18*c*, if desired by a piece of the respective cradle zone 18*a*.

Such a bell or frame component 20 for the engine 3 may include, for example, a first ring element 20*a* constrained to an upper section 18*c* of a wall 18, a second annular element 20*b*, if desired defining inspection slots 20*c* and ending with a flange 20*d* that can be constrained, for example by bolts to a respective flanged part 3*a* of the engine 3.

A bell or frame component 21 for the support of a pump 5 can instead include, for example, a first annular element 21*a* constrained to an upper section 18*c* of a wall 18, a second annular element 21*b*, if desired defining inspection slots 21*c* and ending with a flange 21*d* that can be constrained, for example by bolts to a respective pump 5.

Moreover, the support unit 14 can also define a sort of zone for at least partially containing the flywheel 7, so as to wrap at least a lower part of the same, approximately corresponding to at least 40% of the flywheel 7.

The drive unit or the press could then also be equipped with bottom anchor bolts 17 that must be embedded in the foundation cement to constrain the drive group 1 or the respective press to the ground. In this case, the anchor bolts 17 could be integral or fixed to the base 15, if desired fixed, for example welded or integral to the bolts 15*a*.

If desired, the drive unit provides two or more pumps 5 in communication with each other, more specifically two pumps 5 driven by the same second shaft 5*d* or rotation component, so that by operating one pump the second pump is automatically activated. In this case, one or both pumps 5 would be hollow or in any case would define a passage light of the second shaft 5*d*. Alternatively, other components can be provided for the operation of both pumps 5 by means of the same second shaft 5*d* or the same component driven in rotation by the main shaft 4 or rather the auxiliary shaft 7*a*.

It will also be understood that owing to this expedient, it is possible to optimize the space, as using for example a pump with double displacement, one could make it to rotate more slowly, but since the energy transmitted by the flywheel 7 is a function of the speed squared, it is of interest to rotate the flywheel 7 faster keeping it as small as possible, so it is better to put two or more small pumps rather than a large one.

Actually, in this way one can keep the overall structure more compact, decreasing the number and size of flywheels.

In this description reference will be made in some places to a pump, but it will be understood that the same description applies to the case in which a drive unit includes two or more pumps as indicated.

It will also be noted that a plurality of drive groups 1 could all be supported by the same base 15, if desired, but not necessarily, with their respective main extension axes x-x parallel with each other, so that the drive groups 1 would in fact extend one next to the others.

According to the embodiment illustrated in figures, there are one, two or more rows of five, six or seven drive groups 1 mounted on the same base, although two, three, four, six or more groups together could also be clearly provided.

Moreover, in such a case, a conveying circuit 6 of liquid or gas could be envisaged single for all the groups 1 or several conveying circuits 6 for each drive group 1 or even an intermediate solution between these.

Therefore, two, some or all drive groups 1 may have a common intake 6*a* and/or delivery 6*b* duct or in any case a manifold 6*c* from which derive and/or in which flow the respective intake 6*a* and/or delivery 6*b* ducts of the conveying circuit 6. Of course, if a reverse delivery pump is used, no distinction between the suction duct and the delivery duct could occur.

The press IP also includes an electronic unit for controlling, advantageously programmable, the components of the press itself, such as in particular the motor(s) 3 and the regulator(s) or control component(s) and, if desired, also one or more valves.

Of course, the electronic control unit can integrate or include the control component(s) 8*b* of the switching component(s) 8*a* or the control component 8*b* can be in electronic communication with the control unit for the appropriate performance of analysis, verification or data storage steps.

Of course, there could be a single switching component 8*a* for all groups or a specific one for each group or only for some groups of the press IP.

Similarly, if more than one switching component 8*a* is provided, a single control component 8*b* could be provided for all switching components 8*a* or a specific one for each switching component or only for some switching components 8*a* of the press IP.

As indicated above, the press IP also includes a base component 2*b*, while the at least one drive unit 1 is responsible for supplying liquid or gas to the pressing component 2*a* to move it closer and further away from the base component 2*b* for pressing objects OB in the pressing area, or pressing zone PZ in accordance with the respective work cycles of the press IP.

Of course, the area or pressing zone PZ where the pieces or objects OB to be processed are arranged is defined between base component 2*b* and pressing component 2*a*.

Clearly, one could alternatively have a fixed top component and a pressing plate that can be lifted/lowered for approaching/moving away from the top component by means of the liquid or gas conveyed through the conveying circuit 6

Preferably, one, some or all drive groups 1 are arranged outside the main support structure 24.

Even more preferably, one, some or all drive groups 1 are arranged in a hollowed area or pit RZ of the press or in any case are arranged on the ground or close to the ground, that is to say raised at a distance from the ground less than half a meter or rather less than ten to twenty cm.

Even more preferably, one, some or all drive groups 1 are not mounted above the pressing zone PZ.

Alternatively, the groups 1 could be placed on an anti-vibration system resting on the ground, this is not so much because the groups generate vibration, but to protect them from external vibrations.

The arrangement of groups 1 is clearly important, because, given in particular the size of flywheel 7, it is very heavy and placing it very high above the ground would risk jeopardizing the safety of operators.

If the group(s) are placed as now indicated would avoid vibrations, giving stability or solidity to the system.

If a hollowed area or pit RZ of the press IP is provided for housing the groups, it could have a depth of up to 2-4 meters from the ground or in any case from the ground level on which the main pressing structure of the press IP is mounted.

A press according to the present invention would clearly have the normal components expected in machines of this type.

In this respect, a main pressing structure 24 having uprights or components of sliding support 25 of the pressing component 2*a* and equipped for example with rails or similar for guiding the displacement of that component 2*a* could clearly be envisaged.

The expression "sliding support" clearly indicates that the pressing component 2*a* is mounted and supported by the supporting uprights or components 25 in such a way that it can slide on the latter with any suitable effort, for example of the shoe and guide type.

More specifically, the pressing component 2*a* is actually a slide or "ram" that slides along the uprights 25 or in any case along vertical sections of the main pressing structure 24.

The pressing component 2*a* bears or in any case is integral in translation, preferably vertical, with a first semi-mold, while the other or second semi-mold of the press is made by or integral with or mounted on the base component 2*b*.

In essence, the first semi-mold can be moved in translation in approach-away from the second semi-mold.

The main pressing structure 24 can then include a head 26, which is preferably the upper part that actually holds or supports the thrust of the press.

The hydraulic or oleodynamic or pneumatic press IP then includes one or more actuators or systems 11*a*, 11*b*, 11*c* with one or more hydraulic or oleodynamic or pneumatic cylinders 11*a*1, 11*b*1, 11*c*1, and piston 11*a*2, 11*b*2, 11*c*2, mounted and supported always within the main 1pressing structure 24, each with at least one cylinder fixed or integral or non-movable with respect to the main pressing structure 24 or better to the respective head 26 and one end of at least one piston slidingly mounted within the cylinder as well as integral in translation or displacement with the slide or ram or crossbar 2*a* or vice versa, then with the at least one piston having one end fixed or integral or non-movable with respect to the main pressing structure 24 or to the head and the cylinder in which the piston is slidingly mounted integral in translation or displacement to the slide or ram or crossbar 2*a*.

The expression "integral in translation or displacement" in relation to the cylinder 11*a*1, 11*b*1, 11*c*1 naturally means that the cylinder, as a result of the liquid or gas fed in the same moves together with the pressing component 2*a* and a similar meaning applies to the case where the piston 11*a*2, 11*b*, 11*c*2 is integral in translation or displacement with the pressing component 2*a*.

With regard to the detailed mode of interaction between pressing component 2*a* and conveying circuit 6 or rather between liquid or gas in the conveying circuit 6 and pressing component 2*a*, in at least one cylinder 11*a*1, 11*b*1, 11*e*1 flows a supply section of conveying circuit 6 so as to dispense the liquid or gas within that cylinder and thus control the stem or piston. 11*a*2, 11*b*2, 11*c*2 to come out the cylinder 11*a*1, 11*b*1, 11*c*1, and thus push the pressing component 2*a* appropriately.

Of course, a return section of the conveying circuit to the pumps or compressors would also extend from such a cylinder 11*a*1, 11*b*1, 11*c*1, which return section would determine the re-insertion of the stem or piston 11*a*2, 11*b*2, 11*c*2 in the cylinder 11*a*1, 11*b*1, 11*c*1.

Of course, one could provide a different configuration, and thus with different hydraulic actuators.

In any case, a press according to the present invention provides that the conveying circuit 6 opens directly into at least one cylinder 11*a*1, 11*b*1, 11*c*1 of at least one hydraulic actuator 11*a*, 11*b*, 11*c* which is mounted within and preferably on top of a main pressing structure 24.

There are therefore no intermediate components, for example motors, hydraulic actuators powered by the conveying circuit and which are outside this main structure with then means of transmission of motion or kinematics from these actuators to the ram.

Figure 8:
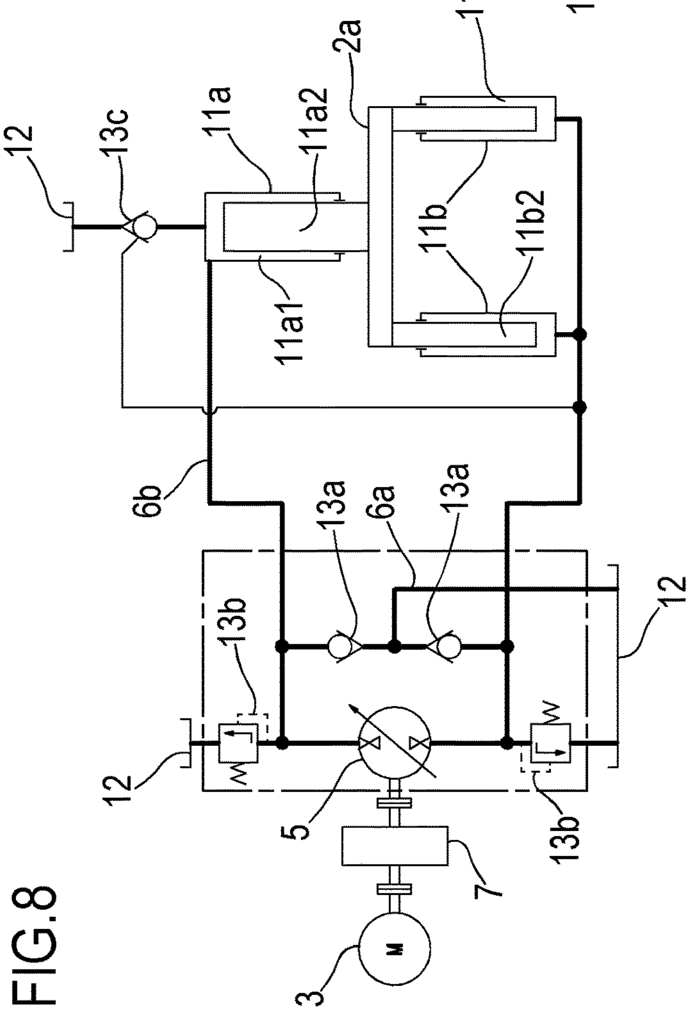
FIG. 8 is an illustrative schematic view of a press structure according to the present invention with simple effect actuators and delivery inversion pump.

With specific reference to the embodiment of FIG. 8, it concerns a press according to the present invention with simple effect actuators and delivery inversion pump with semi-closed circuit.

In this regard, at least one main actuator 11*a* is present, which is arranged to close the press or to approach the slide or ram or crossbar 2*a* to the base component 2*b* to carry out the pressing steps and at least one secondary actuator 11*b* (two according to the embodiment illustrated in figures) arranged to open the press or remove the slide or ram or crossbar 2*a* from the base component 2*b* at the end of a pressing step. Therefore, the at least one main actuator 11*a* and the at least one secondary actuator 11*b* both act on the slide or ram or crossbar 2*a* but so as to move it one in direction opposite to the other.

The conveying circuit 6 instead extends between the ends of pump 5 or compressor and the actuators 11*a*, 11*b* or rather respective cylinders 11*a*1, 11*b*1 of the same.

The circuit 6 includes in this case, respective branches intercepted by valves of the valve group, for example one, two or more compensation and intake valves 13*a* and/or one, two or more pressing overpressure valves 13*b* and/or one or more pre-filling and rapid discharge valves 13*c* and clearly one or more valves to be driven to control the opening and closing of the press which may also be one of the now indicated valves.

The valves could be of any suitable type, for example restraint or unidirectional, suitably loaded for example elastically loaded or however stressed, slide, ball or other type. Moreover, the valves could be unidirectional or two-, three- or more-way.

In addition, at least one auxiliary tank 12 can be provided in fluid communication with the circuit 6. More specifically, respective sections of discharge of liquid or gas of the circuit 6, if desired appropriately intercepted by valves, for example pressing overpressure valves 13*b* flow in the tank 12 and from it (tank 12) sections of liquid or gas inlet in the circuit 6 extend.

The press can then include a flow rate regulator with flow reversal and pressure control that serves for controlling the pump 5 and switching the operation of the same.

According to this embodiment, the suction duct during an operating cycle could become a delivery duct in a subsequent operating cycle in which the operation of the pump has been reversed and vice versa, so it would not be possible to identify a suction duct that remains so for all the operating cycles of the press. Alternatively, the pump could have at least three mouths, one suction and two delivery mouths, in which case the suction duct would always remain the same during each operating cycle, while the pump would direct the fluid alternately first in a first delivery circuit and then in a second delivery circuit.

Figure 9:
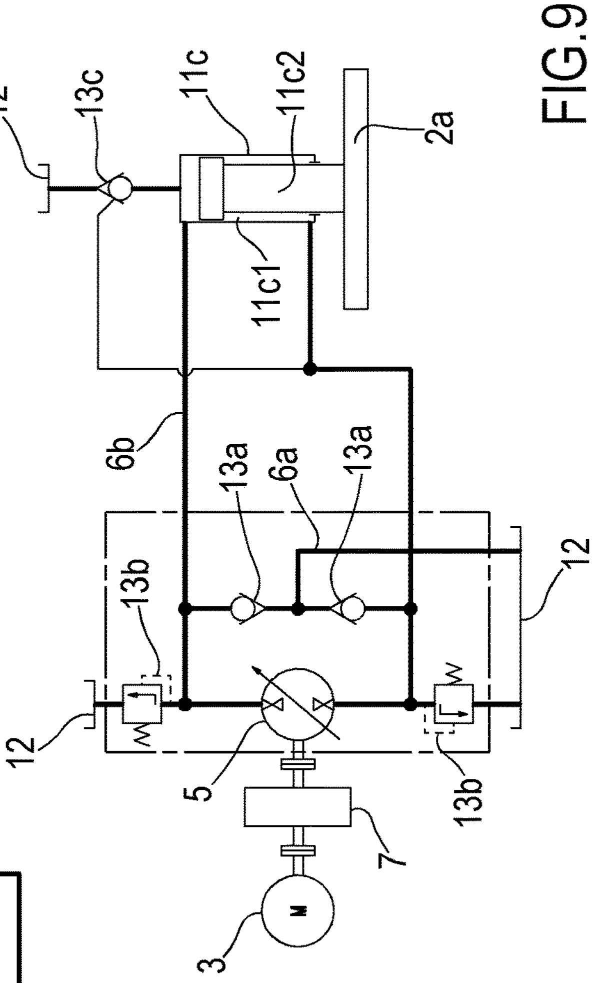
FIG. 9 is a schematic view of another press structure in accordance with the present invention similar to FIG. 8 but with a double-acting actuator.

As for the embodiment in FIG. 9, it concerns a press similar to that of FIG. 8, but with a double-acting actuator.

In this regard, at least one actuator 11*c* is provided alternately responsible for closing the press or bringing the slide or ram or crossbar 2*a* closer to the base component 2*b* to conduct the pressing steps and (in a subsequent working step) to open the press or to move the slide or ram or crossbar 2*a* away from the base component 2*b* at the end of a pressing step.

In this case, the conveying circuit 6 extends between the ends of pump 5 or compressor and the actuator 11*c* or rather respective sections of the cylinder 11*c*1 of the same one opposite to the other with respect to the piston head 11*c*2 mounted in the cylinder 11*c*1.

Figure 10:
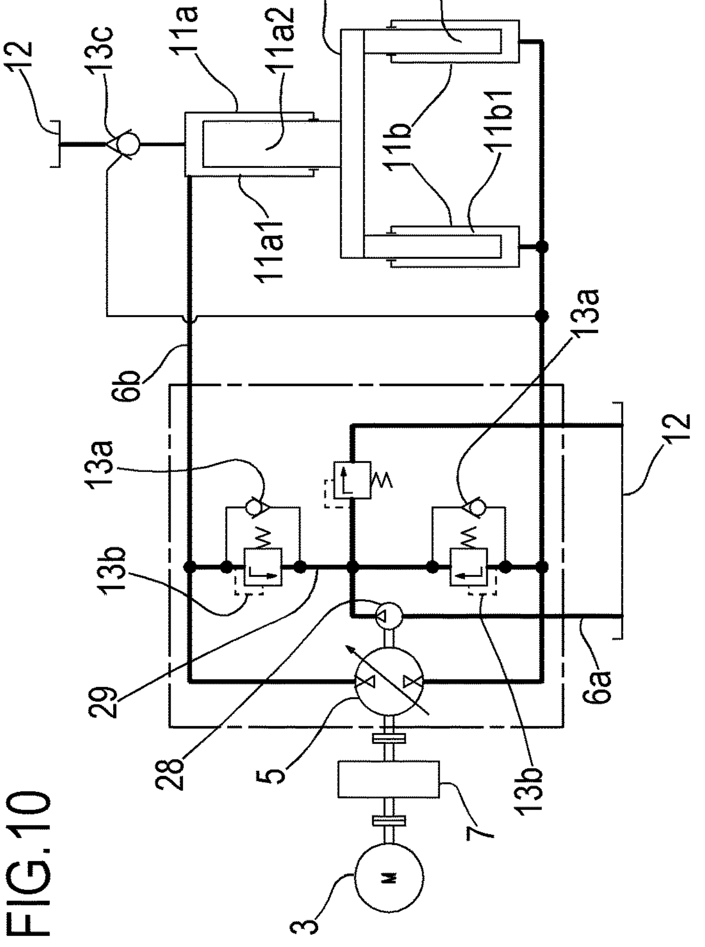

Referring now to the embodiment of press of FIG. 10, it is similar to that of FIG. 8, and thus with simple effect actuators and delivery inversion pump, but with closed circuit.

In such a case, conveying circuit 6 is called closed, as there is no auxiliary tank 12 in fluid communication with it.

At least one auxiliary tank 12*a* can be provided, but the same is part of and is in fluid communication with means arranged to put the circuit 6 under pressure, which means include an auxiliary pump component 28 and auxiliary ducts 29, if desired intercepted by means of respective valves and are responsible for connecting the auxiliary pump component 28 with the auxiliary tank 12.

In this case, the auxiliary pump component 28 is arranged to properly drive the pump or compressor 5 so as to ensure the forced suction of the main pump 5 in the two directions of delivery.

As for the embodiment of FIG. 11, it concerns a press similar to that of FIG. 10, but with a double-acting actuator.

Referring now to the embodiment of press of FIG. 12, it is similar to that of the above mentioned figures with simple effect actuators, but with pump with a single direction of delivery and open circuit.

According to this embodiment, the suction duct 6*a* of the pump 5 or compressor always remains a suction during all operating cycles and the same applies to the delivery duct 6*b*.

Clearly, even in this case, the circuit 6 would include respective branches intercepted by valves of the valve group, for example one, two or more pressing overpressure valves 13*b* and/or one or more pre-filling and quick discharge valves 13*c* and/or one or more main control valves 13*d*.

As for the embodiment in FIG. 13, it concerns a press similar to that of FIG. 12, but with a double-acting actuator.

Of course, the diagrams of FIGS. 8 to 13 are only examples and different structures could be adopted with reference to the actuators, the pump, the branches of the circuit and/or the valves.

Alternatively, the press IZ could be equipped with a pressure multiplier into which the conveying circuit 6 flows and which is then in fluid communication, through a special conveying circuit of liquid or auxiliary gas with an actuator or cylinder and piston system of the hydraulic or oleodynamic or pneumatic press.

According to this variant, at least one pump 5 instead of sending oil or water directly into the cylinder or cylinders, sends it in a pressure multiplier that serves to increase the pressure of the liquid at the expense of the flow rate.

Such a multiplier could, as is known, have a small cylinder-piston group and a large cylinder-piston group, in which case, the oil or water conveyed by the pump or pumps 5 would act directly on the large cylinder-piston group and this would determine a displacement of the small cylinder-piston group with displacement of a respective fluid or liquid, thereby multiplying the pressure to the detriment of the flow rate.

Thus, also pressures of 800-1000 bar of the fluid or liquid actually fed in the hydraulic actuators of the press could be obtained, while a traditional pump is able to deliver fluids with a pressure of about 350-400 bar.

Of course, an intermediate solution could also be envisaged in which the at least one pump 5 is in direct communication both with the hydraulic actuators of the press and with the multiplier in turn in communication with these actuators, in which case one could decide depending on the needs whether to operate in normal pressing conditions or even in conditions of enhanced pressing.

The pistons of the actuators of a hydraulic press slide, preferably, in the axial direction only, i.e. in the direction of approach-removal of pressing component 2*a* and base component 2*b*.

In general, a press according to the present invention is a machine that provides for energy absorption pauses from at least one drive group 1, as the intervals when the drive groups are not used are exploited to bring or bring it again the flywheel 7 in rotation to the desired number of revolutions.

By way of not imitative example only, a press according to this invention can operate so that the first condition or first operating conditions, during which the pressing takes place, has a duration, if desired between ½ and ⅙, for example between ⅓ and ¼ or even less than a second condition or second operating conditions, during which the pressing component 2*a* is not moved.

Of course, particularly in the case of a power, pressure or flow rate regulator, the delivery conditions (pressure/flow rate) of the liquid or gas during the first operating conditions may vary depending on the pressing needs.

In this regard, the regulator could also act according to the object to be pressed and therefore as an alternative or in addition to the needs during the various pressing steps.

With regard to this aspect, with a press according to this invention it is possible to perform a respective method of processing or treatment of pieces or objects OB.

In this regard, with the pump 5 in the second operating condition the motor 3 is placed in rotation which drags the flywheel 7 in rotation until it reaches a certain first number of revolutions per minute, for example about 1500 revolutions per minute.

As above indicated, in the second operating condition the pump 5 or the compressor does not move or push or rather is not able to move or push the liquid or gas in the conveying circuit 6, or moves or pushes it to an extent or with a flow rate or power lower than the first operating condition.

In essence, in this step, even if the motor 3 drags in rotation the flywheel 7, the latter does not transfer the rotary motion to pump 5 or to the compressor or to a second shaft 5*d* of the same or in any case does not drive pump 5 or does not drive it in such a way as to push or move, by means of the fluid conveyed in the conveying circuit 6 by the pump 5 or compressor, the pressing component 2*a*.

At this point, once it is necessary to make a displacement of the pressing component 2*a*, it is switched, by actuation of the switching component 8*a*, if desired by means of the control component 8*b*, the pump or compressor and/or the discharge or by-pass of the conveying circuit 6 in or in a first operating condition, in which the pump or compressor can move or push the liquid or gas in the conveying circuit 6 until it reaches or so as to operate the pressing component 2*a*, as a result of the motion imparted to it by the flywheel 7, with a flow rate or power such as to move it.

In this regard, in the first operating condition, the pump or compressor or rather a respective second shaft 5*d* is kinematically coupled to the flywheel 7 and furthermore the pump and the conveying circuit 6 are arranged in such a way as to be able to push the liquid or gas into the conveying circuit 6 directly (therefore without intermediate components, for example, motors, hydraulic actuators powered by the conveying circuit and which are outside this main structure with then means of transmission of motion or kinematics from these actuators to the ram) or with the sole interposition of a pressure multiplier component up to or so as to operate the pressing component 2*a* so as to move it or with a flow rate or power such as to move appropriately the pressing component 2*a*.

Then as a result of this, the pressing component 2*a* is properly moved, for example so as to perform the desired processing (for example pressing) and this thanks to the action of flywheel 7 which was previously brought to a certain number of revolutions by the engine 3.

Preferably, during this step, when then the flywheel 7 transfers the power to the pump 5, the motor 3 will probably go to maximum torque to try to bring the flywheel 7 back to the revolutions (e.g. 1500) to which it turned as long as the second operating condition was active.

However, as long as the first operating condition is active, the flywheel s slowed down because the engine 3, if switched on, does not fully compensate for the power or energy absorbed by the pump or compressor to move the pressing component 2*a*, so it cannot rotate at the same revolutions at which it rotated during the second operating condition. Alternatively, the engine 3 could be properly decoupled by any suitable means from the flywheel 7 during the first operating condition.

Advantageously, it could also be varied, depending on the pressing needs, the flow rate of the pump 5 or compressor (if with variable flow rate) or even other variables/components of the pump or circuit so as to vary the flow rate/pressure of the liquid or gas delivered by the circuit during the or rather the first operating conditions.

In this regard, once the pressing is finished, it is necessary to take the pressing component 2*a* back to its initial position and this can always be done thanks to the liquid or gas conveyed by pump 5 or compressor or even in another way.

If it is the task of the pump 5 or compressor to take the pressing component 2*a* back to the initial position away from the base component 2*b*, then this could for example be done with simple or double acting actuators as indicated above.

In the case of a reverse delivery pump, then there would be an initial first operating condition during the closure of the press and then the approach of the pressing component 2*a* to the base component 2*b* and, after switching the delivery and suction of the pump, a subsequent first operating condition during the opening of the press and the removal of the pressing component 2*a*.

With reference to the embodiment of FIGS. 6 and 7, in the initial first operating condition, one could have the plate 5*c* at an angle Q>0 or in any case moved in one direction with respect to Q=0 and in the next first operating condition the plate 5*c* is moved so as to delimit an angle Q<0 or in any case moved in an opposite direction with respect to the previous condition.

As indicated above, the power applied during the closing of the press and therefore during the approach of the pressing component 2*a* to the base component 2*b* could be the same as the opening phase of the press and therefore during the removal of the pressing component 2*a* from the base component 2*b*. Alternatively, one could have power applied during the opening step of the press less than the closing step of the same.

Therefore, in the case of a pump made as shown in FIGS. 6 and 7, the angle Q during the closing of the press could have the direction opposite but the same entity at the angle Q during the opening of the press, or it could even be greater than the latter.

Once the displacement or machining (e.g. pressing) has been completed and the pressing component 2*a* has been returned to the rest position or position away from the base component 2*b*, the control component switches back to the second operating condition, so that for example the variable flow pump is brought back with plate 5*c* at an angle Q=0 or around that condition, or a clutch is operated so as to decouple auxiliary shaft 7*a* and second shaft 5*d* or a by-pass or exhaust of the conveying circuit 6 is opened, so that it does not flow or the respective liquid/gas does not push the pressing component 2*a*.

In this condition, since energy or power is essentially no longer absorbed for the displacement of the pressing component 2*a*, the engine 3 will again be able to increase the revolutions per minute of the flywheel 7 bringing it back for example to the number of revolutions previously reached, for example 1500 revolutions per minute.

As it will be understood, thanks to a solution according to the present invention, it is possible to provide a new drive group of pressing components of a hydraulic or oleodynamic or pneumatic press, which allows, among other things, to use small electric motors while ensuring any necessary power peaks, as the electric motor, even not very powerful, could bring in a more or less long time a respective flywheel, in particular with large diameter, to a certain number of revolutions as long as the pump does not need power or in any case it is not necessary to conduct a processing.

However, when the flywheel has reached a predetermined high number revolutions, if power is needed it is possible to switch the operation and put in communication flywheel 7 and pump 5 or open the fluid communication of the conveying circuit of the pump or compressor, so that the rotation of the flywheel 7 allows, thanks to the accumulated energy or power, to made to properly rotate or operate the pump or compressor and then move the relative pressing component 2*a*.

Thus, a solution according to the present invention exploits the pauses between one process and another to prepare by means of a motor 3, even of small dimensions, the flywheel 7 and bring a number of revolutions such as to operate, if required, a pump or a compressor in order to obtain a respective appropriate displacement of a pressing component, for example, a pressing component 2*a* of a press.

A press according to the present invention therefore obviously guarantees an economic and effective operation, as it uses motors, for example small electric ones, but it still manages to guarantee to provide power peaks necessary for a hydraulic or oleodynamic or pneumatic press.

Preferably, in the event that more than 1 drive groups are provided, the electronic control unit is able or responsible for reversing, if desired by means of a special inverter, the operating mode of at least one first drive group 1 from motor to generator, while at least another or second drive group 1 is maintained with motor operating mode, so that it is possible to control the other or second drive group 1 by means of the energy generated by the first drive group.

With regard to this aspect, for example in the event that the electrical supply of the press or drive groups is missing, if a workpiece is in the press, for example closed in the pressing area, it would be necessary to open the press or the pressing zone and extract the workpiece, in order to avoid that, given the high temperatures, fires arise in particular due to the presence of oil in the press.

In this case, the control unit could reverse, for example by means of a special inverter, the operation of one or more second motors 3, so that the other/s first motors would continue to drag the flywheel 7 or the respective flywheels 7 in rotation. At this point, the second engine(s) would therefore tend to slow down the flywheel or flywheels 7, for example from 1500 rpm to 1480 rpm, so that the second engines should, in fact, brake and become generators, since to brake it is necessary to send out of current, which could be conveyed by the electronics for the first or first engines or, if it is not needed or it is too much, even on the network or in a special accumulator.

It is thus possible to obtain a safety function, keeping the press in operation even without the mains electric current and in this case the operator can secure the press by removing the pieces to be worked, then waiting for the current to return from the network.

A press according to the present invention can therefore also be equipped with systems such as to guarantee the extraction of pieces from the press even in the absence or lack of electricity supply.

A press according to the present invention is preferably open-circuit, although it could also be closed-loop.

With reference to this aspect, with the closed circuit it is possible to make feedback to regulate the flow rate delivered and make any corrections.

In this regard, if the control unit establishes that the speed to be given, to the ram is for example 50 mm per second, in the event that a special sensor detects that the speed is lower, the control unit could determine variations (for example tilting of the plate or pump plate) so as to obtain the desired feed speed.

Modifications and variants of the invention are possible the scope of protection defined by the claims.

The invention claimed is:

1. A hydraulic or oleodynamic or pneumatic press comprising a pressing component and a base or top component defining with said pressing component an area or pressing zone (PZ) where to arrange pieces or objects (OB) to be processed, said press further comprising at least one drive group arranged to feed liquid or gas to said pressing component in order to move it towards and away from said base or top component for pressing objects (OB) in the pressing area or zone (PZ), said drive group comprising:

at least one motor arranged to drag a respective main shaft in rotation, at least one pump or a compressor arranged to suck and discharge a liquid or a gas for the displacement of said pressing component, at least one circuit for conveying said liquid or gas in suction, crossing and delivery from said at least one pump or compressor, which conveying circuit is arranged to suitably convey the liquid or gas for pushing or in any case moving or displacing said pressing component, at least one switching component for switching between at least one first operating condition and at least one second operating condition of said at least one pump or compressor and/or a discharge or by-pass of said conveying circuit, said group further comprising at least one flywheel interposed between said at least one motor and said at least one pump or a compressor, said at least one flywheel being kinematically connected on the one hand, to said at least one main shaft, so that said at least one flywheel is dragged into rotation by the latter, and on the other hand, to said at least one pump or compressor to transfer thereto the rotary motion imparted by said at least one motor, so that said at least one pump or said compressor moves or pushes said liquid or gas into the conveying circuit and up to or so as to actuate a respective pressing component following the motion imparted to it by said at least one flywheel only in the at least one first operating condition or to a greater extent in the at least one first operating condition, while in said at least one second operating condition said at least one pump or said compressor does not move or pushes said liquid or gas into the conveying circuit until or so as to actuate a respective pressing component or moves or pushes it into the conveying circuit and until or so as to actuate a respective pressing component to an extent or flow rate or power lower than the at least one first operating condition, said at least one flywheel receiving the rotation energy from said at least one motor at least during the at least one second operating condition, said press further comprising an electronic control unit, wherein said at least one main shaft, said at least one flywheel and a pin or second shaft or rotation component of said at least one pump or compressor are mounted for rotation around the same axis (x-x), wherein said at least one flywheel is fixed or keyed on or in a single piece with the main shaft or on or in a single piece with an auxiliary shaft rigidly coupled or integral in rotation with said main shaft, whereby by activating said at least one motor the latter put into rotation said at least one flywheel, wherein each end of said auxiliary shaft or of said main shaft projects from a respective side of the flywheel and wherein said drive group is provided with a main support unit having a base and vertical walls extending from the base and defining a through opening or an upper cradle zone, a respective end or intermediate part of said auxiliary shaft or of said main shaft being mounted and supported therein or thereon, said press further comprising one or more upper closing components, each couplable with a respective vertical wall to close from above the cradle zone and the auxiliary shaft or the main shaft provided therein, with interposition of special bearings, such a structure with the vertical wall defining a cradle zone and the closing component being provided both on the side of the motor and on the side of the pump, so that both ends of the auxiliary shaft or two parts of the main shaft, each protruding from a respective side of the flywheel, would be supported by the main support unit at respective cradle zones, wherein said at least one flywheel is disc- or ring-shaped with a diameter between about 600 mm and 3 m.

2. The press according to claim 1, comprising a main pressing structure having uprights or components for slidingly supporting said pressing component, said press further comprising at least one actuator or system with at least one hydraulic, oleodynamic or pneumatic cylinder and piston, which actuator or systems is mounted and supported within the main pressing structure, said at least one conveying circuit opening directly in at least one cylinder of said at least one actuator or system with at least one cylinder and piston.

3. The press according to claim 2, wherein said at least one actuator or system with at least one cylinder and piston has a respective cylinder fixed or integral or not movable with respect to the main pressing structure and one end of a respective piston slidingly mounted inside the cylinder as well as integral in translation or displacement with the pressing component or has the respective piston having an end fixed or integral or not movable with respect to the main pressing structure and the cylinder, in which said piston is slidingly mounted, integral in translation or displacement with said pressing component.

4. The press according to claim 1, comprising a pressure multiplier, said at least one conveying circuit opening in said pressure multiplier, said pressure multiplier being in fluid communication with an actuator or system with at least one hydraulic, oleodynamic or pneumatic cylinder and piston of the hydraulic or oleodynamic or pneumatic press.

5. The press according to claim 1, wherein in said at least one first operating condition, said at least one pump or a compressor operates at a first delivery flow rate of said liquid or gas, whereas in said at least one second operating condition said at least one pump or compressor operates at a second delivery flow rate lower than said first flow rate or at a second flow rate equal to zero, and/or in said at least one first operating condition said discharge or by-pass being closed or partially closed, whereas in said at least one second operating condition said discharge or by-pass being open or not closed with respect to said at least one first operating condition.

6. The press according to claim 1, wherein said pump is a variable flow-rate pump, while said switching component is arranged to vary the flow rate of the pump.

7. The press according to claim 1, wherein said at least one motor is an electric motor with power between 10 and 100 kW or higher.

8. The press according to claim 1, wherein said main shaft or said at least one auxiliary shaft is integral in rotation, on the side opposite with respect to said at least one motor and by means of a suitable second shaft or pin or rotation component with the pump or compressor, so that the rotation of the flywheel determines a rotation of a respective second shaft or rotation component of the pump or compressor.

9. The press according to claim 1, wherein said at least one drive group includes at least one bell or frame component for cantileveringly supporting said at least one motor and/or of said at least one pump or compressor, which bell or frame component is cantileveringly supported by a respective vertical wall.

10. The press according to claim 1, wherein:

a bell or frame component for the motor includes a first ring element constrained to an upper section of a wall, a second annular element ending with a flange constrained to a respective flanged part of the engine, a bell or frame component for supporting the pump includes instead a first ring element constrained to an upper section of a wall, a second annular element ending with a flange constrained to a respective pump.

11. The press according to claim 10, wherein said vertical walls have a lower section and an upper section thicker than the lower section and having a free end defining the cradle zone, the two lower and upper sections being connected to each other.

12. The press according to claim 1, wherein said support unit defines a zone for at least partially containing the flywheel, so as to wrap at least a lower part of the same corresponding to at least 40% of the flywheel.

13. The press according to claim 1, comprising a first splined pin and a second splined pin and wherein said first splined pin for connection is provided between the main shaft of the motor and an auxiliary shaft of said at least one flywheel, and/or said second splined pin of connection is provided between the auxiliary shaft of the flywheel and second shaft of the pump.

14. The press according to claim 1, comprising two or more pumps in communication with each other and driven by the same second shaft, whereby by activating a pump the second pump is automatically activated.

15. The press according to claim 1, comprising at least one component for controlling said at least one switching component for switching it between said at least one first operating condition and said at least one second operating condition.

16. The press according to claim 15, wherein said control component is a constant power regulator, which is such as to ensure that the power delivered by said at least one pump (5) or compressor is always the same.

17. The press according to claim 1, wherein said at least one flywheel receives the rotation energy from said at least one motor both during the first and during the second operating condition.

18. The press according to claim 1, comprising a plurality of drive units, wherein said electronic control unit is arranged to reverse a operating mode of at least one first drive unit from motor to generator, while at least another or second drive unit is maintained in a motor operating mode, so that it is possible to control said at least one another or second drive unit by means of the energy generated by said at least one first drive unit.

19. The press according to claim 1, wherein said at least one drive group is arranged in a hollowed area or pit (RZ) of the press or in any case it is arranged on the ground or close to the ground.

20. The press according to claim 19, wherein said at least one drive group is located in a hollowed area or pit (RZ) having a depth of up to 2-4 meters from the ground or in any case from the ground level on which a main pressing structure of the press (IP) is mounted.

21. A method of working or treating pieces or objects with the press according to claim 1, comprising the following steps:

placing said at least one pump or compressor in the at least one second operating condition and putting into rotation said at least one motor so as to drag said at least one flywheel into rotation until taking said at least one flywheel to a given first number of revolutions per minute, when it is necessary to move the pressing component, operate the switching component so as to bring the pump or the compressor and/or the discharge or by-pass into the at least one first operating condition, so that the actuation of the pump or compressor by said at least one flywheel determines a thrust of the liquid or gas in the conveying circuit until or so as to actuate said pressing component, in this step said at least one flywheel being slowed down due to the power or energy absorbed by said at least one pump or compressor for the displacement of the pressing component, once the displacement of said pressing component has been completed, control said switching component again so as to switch the pump or the compressor and/or the discharge or by-pass, in the at least one second operating condition, in the at least one second operating condition the motor succeeding again in increasing the revolutions per minute of the flywheel bringing it back to the first number of revolutions.

22. The method according to claim 21, wherein when the movement of the pressing component has been carried out and when a pressing step of a workpiece is terminated, the energy used by said at least one flywheel to drive said pump or compressor and properly push the liquid or gas in said at least one circuit for conveying up to or so as to operate the pressing component determines a reduction in the revolutions of said at least one flywheel from about 1500 rpm to about 1300 rpm.

* * * * *